Figure 1:
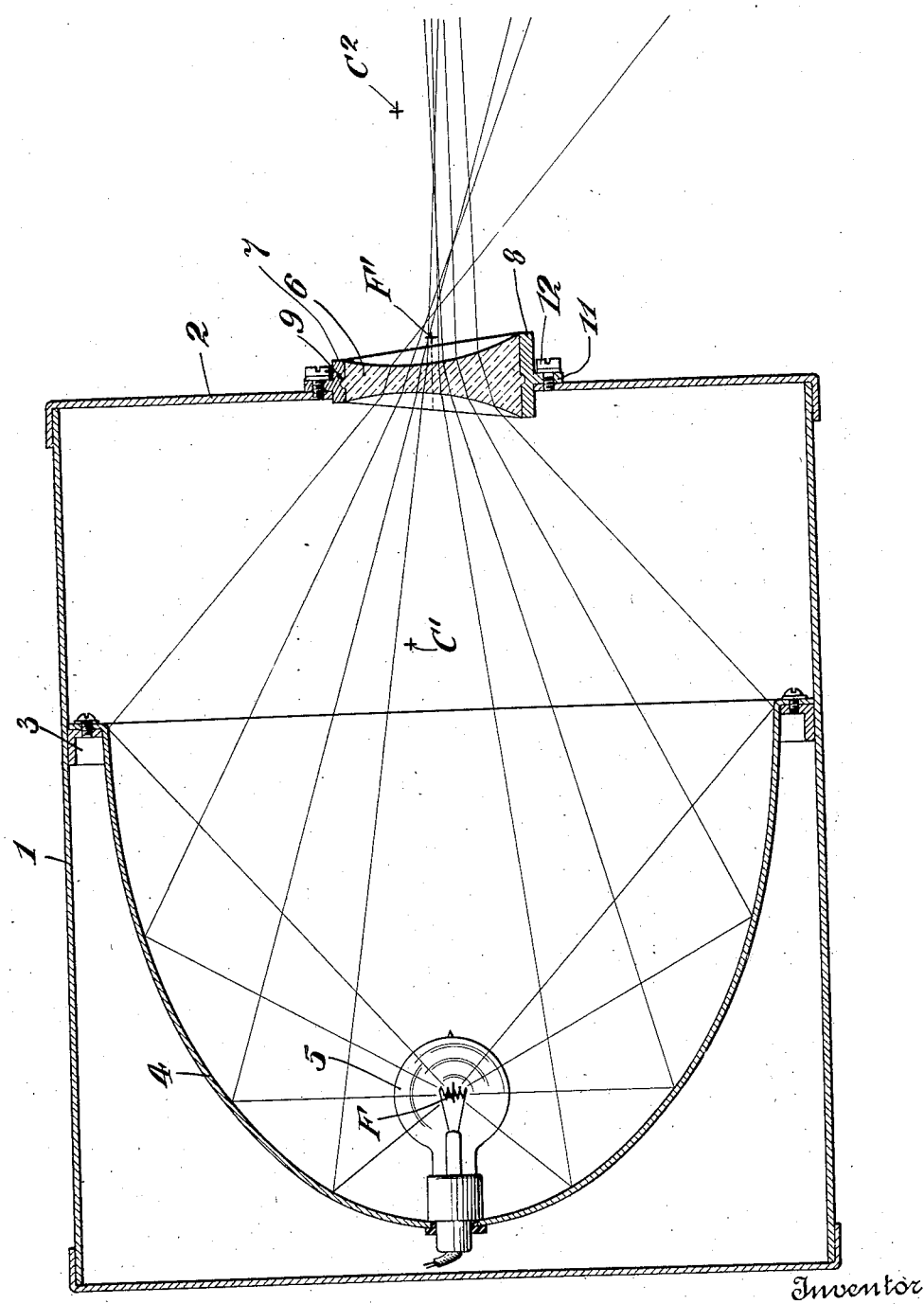

Dec. 16, 1924. 1,519,737

E. LYNDON
LIGHT PROJECTOR
Filed Oct. 6, 1921 2 Sheets-Sheet 1

Inventor
Edward Lyndon
By Dean, Fairbank, Obright & Hirsch
his Attorneys

Dec. 16, 1924.  
E. LYNDON  
1,519,737  
LIGHT PROJECTOR  
Filed Oct. 6, 1921  
2 Sheets-Sheet 2

Inventor  
Edward Lyndon  
By Dean, Fairbank, Obright & Hirsch  
his Attorneys

Patented Dec. 16, 1924.

1,519,737

UNITED STATES PATENT OFFICE.

EDWARD LYNDON, OF NEW YORK, N. Y.

LIGHT PROJECTOR.

Application filed October 6, 1921. Serial No. 505,688.

*To all whom it may concern:*

Be it known that I, EDWARD LYNDON, a citizen of the United States, and resident of New York city, in the county of New York and State of New York, have invented certain new and useful Improvements in Light Projectors, of which the following is a specification.

My present invention relates to projectors of light and with regard to its most specific application to headlights for vehicles, such as automobiles.

It is an object of the invention to provide an automobile headlight which shall effect a distribution of light in accordance with the usual requirements of State laws, and without the use of screens, auxiliary reflectors or expensive lens constructions.

Another object is to provide a device of the above type which shall be of short construction, and which shall be economical in power consumption, the light from the lamp being usefully distributed, substantially without waste.

According to a preferred feature, the headlight includes a reflector or mirror having a bi-focal geometrical conformation, preferably an ellipsoid, the source of light being at one of the foci, and a refracting member of small diameter adjacent the conjugate focus, and intercepting substantially all of the reflected rays, said refracting member being so conformed and disposed that it will deflect the various rays of the pencil of light reflected from the mirror, in accordance with the requirements of State laws.

In the preferred embodiment, the device is particularly short, the front of the headlight on which the lens is carried being placed between the two conjugate foci of the mirror and adjacent the focus conjugate to that at which the light is located. The lens has a conformation such as to refract downwardly the generally upwardly directed rays reflected from the lower half of the ellipsoidal mirror, thereby to direct the rays below the plane of the axes of the headlights, as required.

In the preferred specific embodiment, the lens is of small aperture and intercepts all of the rays of the pencil converging toward the conjugate focus, and is bi-concave in form and wider at its bottom than at its top, so that the upper portion of the lens will have little or none and the lower half substantial refractive power.

In the preferred embodiment, the lens is symmetrically curved in horizontal cross-section to spread the rays symmetrically to the sides for effective lateral distribution.

In the specific embodiment which is preferred, the lens has spherical concavity at both faces thereof, the centers of curvature of the concavities being above the center of the lens.

Figure 2:
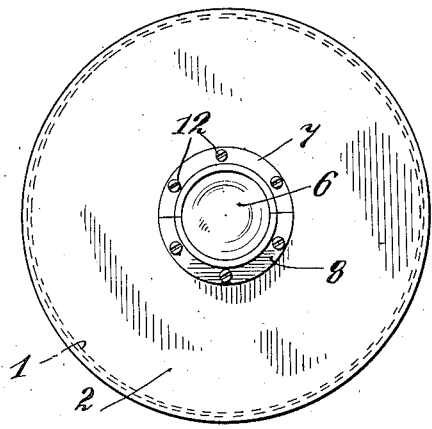
Figure 4:
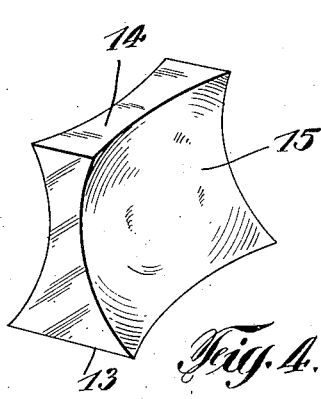
Figure 3:
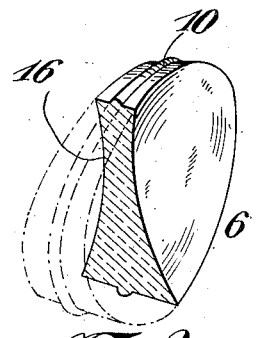
Figure 5:
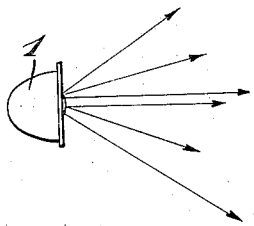
Figure 6:
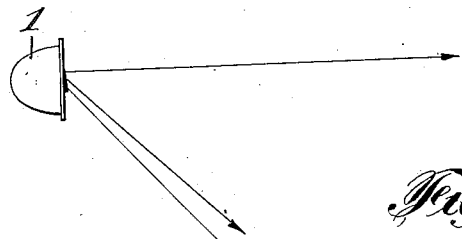
Figure 7:
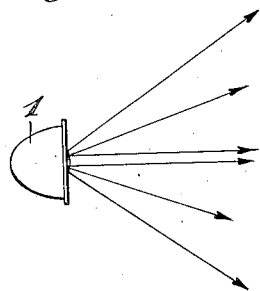
Figure 7:
Figure 7:
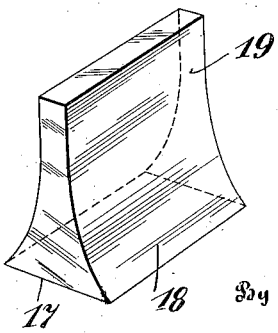

In the accompanying drawings in which is shown one or more of various possible embodiments of the several features of the invention, Fig. 1 is a view in longitudinal cross section of a preferred form of headlight showing the distribution of rays, Fig. 2 is a front view of the headlight, Fig. 3 is a perspective view partly in section of the preferred form of lens, Fig. 4 is a perspective view of a modified form of lens, Fig. 5 is a diagrammatic view illustrating the lateral distribution of light, Fig. 6 is a diagrammatic view illustrating the vertical distribution of light, and Fig. 7 is a perspective view of another modified form of lens.

Similar reference characters refer to similar parts throughout the several views of the drawings.

Referring now to the drawings I have shown a headlight including a casing 1 having a front closure which may be a cap 2. Secured within the casing by a frame 3 is a reflector or mirror 4 of bi-focal geometrical conformation. The mirror preferably is of sheet metal and has the surface conformation of a semi-ellipsoid of revolution. Substantially at one focus F is located the incandescent filament of the electric lamp 5 which preferably extends axially of the mirror and is fitted into the rear thereof.

The preferred form of headlight is of short construction, the front cap 2 of the casing being between the focus F and the conjugate focus F' of the ellipsoid rather than beyond the conjugate focus. The lens or other refracting element 6 as shown in the drawings, need have only a relatively small diameter or aperture sufficient to intercept the converging pencil of rays, which the ellipsodial mirror reflects. The lens is preferably secured at the center of the front plate by means of a circular frame made up of two semicircular elements 7 and 8, surrounding the rim of the lens and having a groove 9 within which fits an integral peripheral ledge 10 on the lens, a rim 11 of the frame being secured as by screws 12 to the front cap.

In the preferred embodiments, the lens is bi-concave as best shown in Figs. 1, 3 and 7 and wider at its bottom 13 than at its top 14. Preferably, the lens is made from a circular blank as shown in Fig. 3, the two faces having spherical concavities of equal radius, the line connecting the centers of curvature of said concavities being spaced from the center of the circular blank and perpendicular to said blank. The spherical grinding heads (not shown) which are used to polish the spherical concavities 15, 16 are correspondingly placed, not at right angles to the plane of the lens but equally inclined with respect thereto, the centers of curvature of the spherical surfaces being indicated in Fig. 1 at C' and C². The centers of curvature when the lens is applied, it will be seen, are located in the vertical bisecting plane of the lens, but above the horizontal bisecting plane. The blank, as shown in Fig. 3 will, as is easily understood, be materially thicker near the bottom than near the top. The lens being applied as shown in Fig. 1 with the thick portion lowermost, it will be seen that the rays will assume the general direction indicated. The lower half of the lens forms substantially a prism of wide refracting angle and intercepts the upwardly reflected rays from the mirror, refracting them as shown to emerge from the lens substantially in a horizontal direction. The upper half of the lens constitutes substantially a prism of small angle and has small refracting power, so that the direction of the upper downwardly reflected rays is not materially changed and said rays continue on their generally downward path. By reference to Figs. 1 and 6, it will be seen that the rays are thus deflected by the lens in conformity with the usual requirements, substantially none of the rays projecting above the horizontal axial plane of the headlight. A material proportion of the rays is directed downwardly to illuminate the roadway and another substantial proportion is directed horizontally to enable the driver to see far ahead.

The lens being symmetrically concave along horizontal sections thereof, the light will be refracted laterally and symmetrically toward both sides, as best shown in Fig. 5.

In Fig. 4 is shown a modified form of lens, rectangular rather than circular in contour. The concavities of this lens are, however, identical with those of Fig. 3 and the optical effects will be substantially the same as those due to the form shown in Fig. 3. It will be understood that this lens is carried in a correspondingly rectangular frame.

In Fig. 7 is shown an alternative form of refracting body or lens, which, it will be noted comprises a lower section 17 generally wedge-shaped or prism-like in form, having preferably a cylindrical concavity 18 merged into an upper portion 19 of substantially flat plate glass formed intergral with the lower portion. It will be seen that the cylindrical lens portion will effect refraction in the vertical plane substantially the same as that of the lower half of the lens shown in Fig. 1, while the upper plate glass portion will not change the direction of the rays intercepted thereby, so that the direction of the rays reflected downwardly from the upper half of the mirror will continue through the upper plate glass portion of the lens to illuminate the roadway. The modified form of lens having no curvature along a section taken horizontally, it will be seen that this lens does not change the direction of the rays by lateral refraction, so that the converging pencil will substantially continue to its focus and then become a diverging pencil there-beyond, to effect the lateral distribution of light.

The lens of Fig. 7 is shown of rectangular contour, but it will be understood that this form of lens may be made in circular contour as that shown in Fig. 3. It will also be apparent that either of the forms of lens shown may be formed of elliptical or other contour, if desired.

Although I prefer to provide the short construction of headlight above described, in which the lens is between the conjugate foci and adjacent one of them, it will, of course, be understood that the lens could be provided beyond the conjugate focus to intercept the diverging pencil of rays extending from the conjugate focus. In this construction in order to obtain the desired distribution, the thicker portion of the lens would be uppermost and the thinner portion lowermost.

Thus I have provided a headlight construction which is easy to manufacture, and the refracting or lens element of which is of small diameter and can readily be polished with the ordinary grinding heads and yet alone effects such deflection of the rays of the converging pencil of light reflected by the ellipsoidal mirror as to comply in every particular with the requirements of the State laws. It will be noted that the headlight is economical in action, the small lens intercepting all of the rays after only a single reflection from the mirror. The desired distribution is effected without the help of auxiliary reflectors and screens, thus effecting economy of material and labor in the construction of the lamp, and economy of power consumption since the light from the lamp is substantially all usefully distributed without the waste involved in the use of secondary mirrors or screens.

It will also be seen that the lens completely closes the aperture to the headlight, preventing the entry of dust or foreign matter and that the curvature of the lens is continuous throughout its area, avoiding any sharp angles or abrupt shoulders, which might produce undesirable spectral effects.

It is also manifest that a plano concave or convexo concave lens could be used instead of one of bi-concave form and that lenses of other shapes may be used, where different light distributions are to be effected.

Obviously, the principle of my invention could be applied in other relations and for effecting other distributions of light, as for instance, to locomotive headlights, for stage illumination and the like.

I claim:—

1. In a headlight, in combination, a reflector having the conformation of a semi-ellipsoid of revolution, a source of light at one of the foci, said headlight including a casing having a forward end extending between the two foci of the ellipsoid, a lens of small aperture disposed in the center of said forward end and intercepting substantially all of the directly reflected rays from the reflector, said lens being bi-concave in vertical cross-section, the centers of curvature of the two faces being above the focal plane of the ellipsoid, so that the lens is thicker at its bottom than at its top.

2. In a light projector, in combination, a casing, an ellipsoidal reflector therein, a source of light at one of the foci thereof, a refracting member of small aperture relative to the diameter of said mirror, adjacent the other focus and between the two foci, said refracting member having a double curvature to refract the rays both in a vertical and in a horizontal direction, the refracting member being asymmetrical in form with respect to one axis and symmetrical in conformation with respect to the axis at right angles to said first axis.

3. In a headlight for automobiles and the like, in combination, a casing, an ellipsoidal reflecting surface therein, a source of light substantially at one of the foci thereof, the forward end of said casing extending between the foci of said ellipsoid, a refracting member of small aperture relative to the diameter of said surface and disposed at the center of said forward end, said refracting surface intercepting substantially all of the rays after single reflection from said surface, said lens being concave in a vertical section and below the horizontal axial plane of the ellipsoid to refract the generally upwardly reflected rays downwardly to substantially a horizontal plane, said lens having asymmetrical curvature in horizontal section to refract the rays in a horizontal plane and symmetrically toward both sides of the vertical axial plane.

4. The combination set forth in claim 3 in which the lens is concave both in vertical and in horizontal cross-section.

5. In a headlight for automobiles, and the like, in combination, a casing, a reflecting surface therein of ellipsoidal conformation, a source of light near one of the foci thereof, a lens adjacent the conjugate focus thereof and between the two foci, said lens having small diameter relative to that of the reflecting surface and intercepting substantially all of the rays reflected therefrom, said lens having a spherical concavity at one side thereof, symmetrical with respect to a vertical axial plane and asymmetrical with respect to a horizontal axial plane to provide a greater thickness near the bottom than near the top of the lens for effecting a substantial deflection of the rays refracted from the lower half of the reflecting surface to bend said latter rays downwardly to substantially the horizontal focal plane.

6. In a headlight for vehicles, in combination, a casing having an ellipsoidal reflecting surface therein, a source of light at one of the foci thereof, the front of said casing being between the two foci thereof, a lens mounted substantially at the center of said front, said lens having spherical concavity at both sides thereof, the centers of curvature of said concavities being in the vertical focal plane of the ellipsoid, but substantially above the horizontal axis, so that said lens is substantially thicker near its bottom than near its top.

Signed at New York in the county of New York and State of New York this 4th day of October A. D. 1921.

EDWARD LYNDON.